United States Patent
Csanadi et al.

(10) Patent No.: US 10,247,271 B2
(45) Date of Patent: Apr. 2, 2019

(54) SINTERED FRICTION MATERIAL FOR A FRICTION LINING

(71) Applicant: HOERBIGER ANTRIEBSTECHNIK HOLDING GMBH, Schongau (DE)

(72) Inventors: Zoltan Csanadi, Diessen (DE); Bruno Tourneret, Landsberg am Lech (DE); Peter Echtler, Schongau (DE); Werner Fuerguth, Biessenhofen/Altdorf (DE); Andreas Ohr, Schongau (DE); Andreas Schnabel, Bernbeuren (DE)

(73) Assignee: HOERBIGER ANTRIEBSTECHNIK HOLDING GMBH, Schongau (DE)

( * ) Notice: Subject to any disclaimer, the term of this patent is extended or adjusted under 35 U.S.C. 154(b) by 35 days.

(21) Appl. No.: 15/624,973

(22) Filed: Jun. 16, 2017

(65) Prior Publication Data

US 2017/0363167 A1  Dec. 21, 2017

(30) Foreign Application Priority Data

Jun. 17, 2016  (DE) .................. 10 2016 111 122

(51) Int. Cl.
*B22F 3/10* (2006.01)
*C22C 1/04* (2006.01)
*C09K 3/14* (2006.01)
*F16D 69/02* (2006.01)
*B22F 7/04* (2006.01)
*C22C 1/05* (2006.01)
*C22C 29/02* (2006.01)

(52) U.S. Cl.
CPC .............. *F16D 69/027* (2013.01); *B22F 3/10* (2013.01); *B22F 7/04* (2013.01); *C09K 3/14* (2013.01); *C22C 1/0425* (2013.01); *C22C 1/05* (2013.01); *C22C 29/02* (2013.01); *B22F 2301/10* (2013.01); *B22F 2301/30* (2013.01); *B22F 2302/10* (2013.01); *B22F 2302/40* (2013.01); *F16D 2200/0026* (2013.01); *F16D 2200/0043* (2013.01); *F16D 2200/0052* (2013.01); *F16D 2200/0082* (2013.01)

(58) Field of Classification Search
CPC ........... C09K 3/14; C22C 1/0425; C22C 1/05; C22C 29/02; B22F 3/10; B22F 7/04; B22F 2301/10; B22F 2301/30; B22F 2302/10; B22F 2302/40; F16D 69/027; F16D 2200/0026; F16D 2200/0043; F16D 2200/0052; F16D 2200/0082
See application file for complete search history.

(56) References Cited

U.S. PATENT DOCUMENTS

| | | | |
|---|---|---|---|
| 4,951,798 A | 8/1990 | Knoess | |
| 6,197,432 B1 | 3/2001 | Fujita et al. | |
| 2003/0099853 A1* | 5/2003 | Takayama | C22C 9/02 428/553 |

FOREIGN PATENT DOCUMENTS

| | | |
|---|---|---|
| DE | 3623929 A1 | 1/1988 |
| DE | 3806828 A1 | 9/1989 |
| EP | 1009545 B1 | 5/1997 |
| GB | 545522 A | 6/1942 |
| JP | H11-80 854 | 3/1999 |

* cited by examiner

*Primary Examiner* — Anthony J Green
(74) *Attorney, Agent, or Firm* — McNees Wallace & Nurick LLC

(57) ABSTRACT

A sintered friction material comprises a metallic matrix and granular constituents embedded in the matrix. The metallic matrix comprises a copper base alloy. The friction material is characterized in that the granular constituents comprise at least one sintered cemented carbide in a proportion of up to 9 weight percent, based on the total weight of the friction material. Furthermore, a friction body, in particular for clutches and brakes, that comprises a friction lining with at least one layer made of the sintered friction material, and a method for the production of a friction lining with the sintered friction material are described.

11 Claims, 1 Drawing Sheet

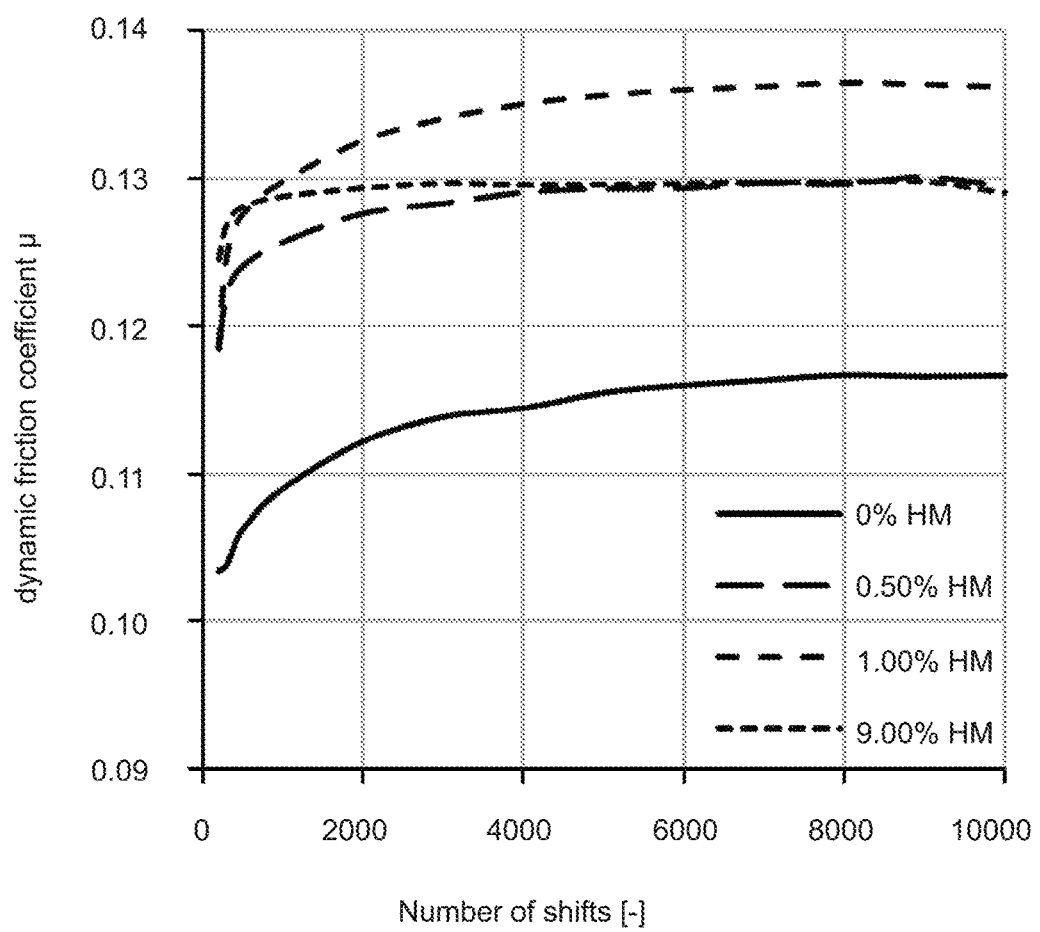

SINTERED FRICTION MATERIAL FOR A FRICTION LINING

FIELD OF THE INVENTION

The invention relates to a sintered friction material for a friction lining, in particular a friction material for oil operation. Furthermore, the invention relates to a method for the production of a friction lining made of the sintered friction material, a friction body including the friction lining, and the use of the sintered friction material as a friction lining in a friction body, in particular for clutches and brakes.

TECHNICAL BACKGROUND

Friction materials have been widely used in drive technology, in particular in clutches, gears or brakes. The friction coefficient of the friction materials is intended to be as high and constant as possible.

Production of friction linings based on sintered friction materials is cost-effective. In particular foil technology and scatter-sintering processes are used. In foil technology, suitable powder blends are pre-pressed by pressing tools into thin rings which are then sintered onto an optionally pre-treated carrier material by pressure sintering. In the scatter-sintering process, the friction material is scattered onto a carrier in the form of a powder blend and then passed through a sintering furnace. Binding of the sintered friction material to the carrier can be improved by an adhesion promoter that can optionally be scattered onto the carrier as a thin layer. Friction rings having a friction lining produced by means of the scatter-sintering process are, for example, described in DE 36 09 879.

EP 0 505 345 B2 discloses a sintered friction material for friction linings of clutches and brakes containing powdery and/or granular metallic and non-metallic constituents, at least one of the metallic constituents predominantly or completely consisting of brass. In particular, the friction material can be composed of brass, quartzite, graphite, aluminum oxide, tin, and iron.

From DE 197 11 830 C2 a sintered brake lining for a braking element made of fiber-reinforced ceramic is known, containing primary carbon and metallic particles that are at least partially reaction-bonded to the primary or pyrolytically formed carbon. In addition, the brake lining can include additives of hard material particles, pyrolyzed organic binders or solid lubricants.

DE 103 38 200 B4 describes clutch linings made of fiber-reinforced ceramic materials containing fibers made of carbon, and whose matrix material is selected from inorganic polymers, oxidic ceramics, set cements, element-organic polymers, and inorganic disperse solids held together by an inorganic or organic binder. In addition, the matrix material can contain inorganic disperse solids selected from silicon dioxide, silicon nitride, aluminum oxide, titanium dioxide, titanium carbide, tungsten carbide, silicates, and titanates, and be bound by inorganic compounds forming glass phases.

DE 2012147 A1 shows a safety brake mechanism for rail-mounted means of conveyance in mining having at least one brake shoe that can be pressed to a guide rail whose brake surface is provided with a friction-increasing coating. The coating comprises a solder layer in which coarse carbide particles of a grain size of approximately 1.5 to 3 mm are embedded at a short distance from each other.

EP 1 666 75 discloses a friction apparatus having at least one pair of sliding surfaces brought into contact with each other. The friction apparatus comprises a friction surface containing silicon carbide and a friction surface counterpart with a cermet layer containing tungsten carbide. The cermet layer can be applied onto a carrier by flame spraying.

Although friction linings made of sintered friction materials can be produced cost-effectively, as compared to carbon-based friction linings, they have a lower friction coefficient level. In addition, friction behavior in sintered friction materials for oil operation strongly depends on the gear oil used.

SUMMARY OF THE INVENTION

It is the object of the invention to provide a sintered friction material with an improved friction coefficient level.

According to the invention, this object is resolved by a sintered friction material that comprises a metallic matrix and granular constituents embedded in the matrix, the metallic matrix comprising a copper base alloy, and is characterized in that the granular constituents comprise at least one sintered cemented carbide in a proportion of up to 9 weight percent, based on the total weight of the friction material.

The friction coefficient of a friction material can be considerably increased by adding hard material particles. However, the common hard materials such as tungsten carbide are not sufficiently wetted by the metallic solders used in sintered friction materials. Due to the low temperatures used during the production of friction linings and the short dwelling times in the sintering furnace sintering of the hard materials cannot take place. Surprisingly, it was found that agglomerated and sintered cemented carbide powders can be incorporated into a friction material and integrally bonded to the other constituents of the friction material at the temperatures and dwelling times commonly used in scatter-sintering processes. This makes it possible to provide a sintered friction material achieving almost the friction coefficients of carbon-based friction linings and showing less dependency on the friction behavior of the gear oils used. Furthermore, additional cost savings can be achieved due to the layered structure of the friction lining in the scatter-sintering process.

Sintered cemented carbides are alloys made of a metallic hard material, usually a carbide of tungsten, titanium, tantalum and/or chromium in a metallic binder such as cobalt, nickel and other alloys, that are formed by sintering. According to a preferred embodiment the friction material contains the sintered cemented carbide in a proportion of at least 0.2 weight percent, preferably 0.5 to 5 weight percent and particularly preferably 0.5 to 3 weight percent. It is especially preferred that the sintered cemented carbide is contained in a proportion of 0.5 to 2 weight percent, each based on the total weight of the friction material. An excessive proportion of the sintered cemented carbide of more than 9 weight percent results in intense wear of the friction surface counterpart commonly made of steel. If the proportion of the sintered cemented carbide is too low, less than 0.2 weight percent, no sufficient increase in the friction coefficients will be achieved as compared to friction materials free of sintered cemented carbide.

The grain size of the sintered cemented carbide is preferably in a range of 1 to 200 µm, preferably 10 to 100 µm, and particularly preferably 10 to 80 µm. A grain size distribution in the range of 10 to 60 µm is especially preferred.

The primary grain size of the carbide is preferably in a range of 1 to 15 µm, particularly preferably 1 to 5 µm. The primary grain size is the grain size of the hard material in the sintered cemented carbide. Preferably, tungsten carbide is used as a hard material. With primary grain sizes of more than 15 µm abrasive wear at the friction surface counterpart made of steel is too high.

The metallic binder of the sintered cemented carbide is preferably a metal selected from the group consisting of iron, cobalt, nickel, chromium, molybdenum, aluminum, and combinations thereof, or an alloy thereof. Preferably, the alloy is free of cobalt. It is especially preferred that the binder of the sintered cemented carbide is an alloy of iron, chromium, and aluminum.

According to a preferred embodiment the sintered cemented carbide comprises 70 to 95 weight percent of tungsten carbide (WC) in a metallic binder such as FeCrAl or cobalt, and optionally chromium and/or nickel. It is especially preferred that the sintered cemented carbide is composed of 83.5 to 88% WC, 9 to 11% Fe, 2.5 to 4% Cr, and 0.5 to 1.5% Al, each based on the total weight of the sintered cemented carbide.

To produce the sintered cemented carbide, a powder blend made of the metallic hard material and the binder is ground, agglomerated by spray drying, and subsequently sintered such that a sintered cemented carbide powder having a spherical grain shape is formed. However, sintered and subsequently broken sintered cemented carbide powders having an irregular grain size can also be used. Sintered cemented carbide powders are commercially available.

Further objects of the invention are a friction body including a friction lining that comprises at least one layer made of the friction material according to the present invention, a method for the production of a friction lining with at least one layer made of the friction material according to the present invention, and the use of the sintered friction material as a friction lining in a friction body, in particular for clutches and brakes.

DESCRIPTION OF THE DRAWINGS

Further features and advantages of the present invention are disclosed in the following description of preferred embodiments in conjunction with the drawing, which are, however, not to be understood as limiting. In the drawing:

The FIGURE is a graph showing the friction behavior of friction materials comprising various proportions of sintered cemented carbide.

DETAILED DESCRIPTION

To produce a friction lining made of a sintered friction material, a powder blend is provided that contains a copper base alloy, preferably a brass alloy, and granular constituents. Optionally, further metals or metal alloys such as copper or iron can be added in small proportions. Preferably, the copper base alloy and the other metals or metal alloys have a melting point (solidus temperature) of more than 800° C., particularly preferably more than 900° C., and thus do not melt under the selected sintering conditions and form the metallic matrix of the sintered friction material.

The other granular constituents comprise in particular one or more metal oxides, carbides, nitrides or borides, preferably aluminum oxide and/or silicon dioxide, optionally also in the form of mineral additives such as corundum or quartzite.

The powder blend may contain further additives, including graphite used for building structure a tribologically efficient surface layer, as well as adhesion promoters, solders, and fluxes. In particular metals and metal alloys having a lower melting point than the matrix-forming copper base alloy that can be present in the liquid phase at the selected sintering temperatures and contribute to the integral bonding of the constituents of the friction material to each other and the carrier material are used as adhesion promotors and/or solders. Metal halides can be used as fluxes.

According to the invention, the powder blend for the production of a sintered friction lining contains a sintered cemented carbide powder in a proportion of up to 9 weight percent, preferably 0.2 to 9 weight percent.

The copper base alloy is preferably a tin bronze, a brass alloy, a copper-tin-zinc alloy or a copper-titanium alloy.

It is especially preferred that the copper base alloy is a brass alloy. The brass alloy can have a copper content in a range of 70 to 90 weight percent and a zinc content of 10 to 30 weight percent. Preferably, the content of the copper base alloy, in particular brass, is up to 90 weight percent of the powder blend. Brass alloys have a very good resistance, in particular to EP additives used as oil admixtures.

In particular metals and metal alloys having a melting point (solidus) of less than 800° C. are used as adhesion promotors and/or solders. Examples of such metals and metal alloys are tin and copper alloys such as CuSn15. To avoid environmental and health damage during production and use of the sintered friction materials, no lead-containing additives are used.

Preferably, the powder blend for the production of the sintered friction material has the following composition:

60 to 91.8 weight percent of the copper base alloy, in particular a brass alloy;

0 to 25 weight percent of further metals or metal alloys, in particular iron and/or copper;

5 to 15 weight percent of graphite;

3 to 10 weight percent of granular constituents, in particular metal oxides, carbides, nitrides, and borides;

0.2 to 9 weight percent of sintered cemented carbide powder; and 0 to 15 weight percent of further additives such as adhesion promotors, solders, and fluxes, in particular metals or metal alloys with a melting point of less than 800° C.;

all constituents together being 100 weight percent.

The grain size of the powder made of the copper base alloy, in particular the brass powder, is preferably between 40 and 200 µm. Preferably, the sintered cemented carbide powder has a spherical grain shape and a grain size in a range of 15 to 55 µm. The grain size distribution of the other constituents is selected such that the powder blend forms a homogeneous, free-flowing blend.

A tungsten carbide bound in a FeCrAl binder is used as a sintered cemented carbide. The sintered cemented carbide powder is agglomerated and sintered, wherein the primary grain size of tungsten carbide in a range of 1 to 5 µm. Preferably, the carbide powder has the following composition: 83.5 to 88% tungsten carbide (WC), 9 to 11% iron, 2.5 to 4% chromium, and 0.5 to 1.5% aluminum. In general, sintered cemented carbide powders having a WC content of 75 to 95 weight percent and a metallic binder in a proportion of 5 to 25 weight percent are used. Apart from the binder made of a FeCrAl alloy mentioned above, cobalt and optionally nickel can also be used as binders.

To produce a friction lining using the scatter-sintering process, the powder blend is applied onto a cleaned planar carrier component made of steel and sintered onto the carrier component in a sintering and brazing process at a temperature of 800° C. to 840° C. Optionally, a thin layer of an adhesion promotor, in particular a hard solder such as CuSn15 and/or a soft solder such as tin, can be scattered onto the carrier component prior to application of the powder blend. Following sintering, the friction lining obtained can be compacted to the desired thickness in a compactor and provided with grooves. A porosity of the compacted friction lining is preferably set to approximately 10 to 40%. Subsequently, the component provided with the friction lining can be cold-formed to form the desired friction body and gas nitrocarburized to increase wear resistance.

The thickness of the friction lining is preferably in a range of 300 µm to several millimeters, preferably between 350 and 1,000 µm. Due to the high material costs of the sintered cemented carbide the friction lining on the friction body can also be formed as a multi-layer coating with at least one cost-effective basic layer on the carrier component containing no sintered cemented carbide, and a sintered cemented carbide-containing friction layer formed on the basic layer that is made of the friction material according to the present invention. The improved friction properties of the friction lining remain unchanged in the multi-layer structure. The basic layer and the friction layer made of the friction material according to the present invention are integrally bonded to each other due to the solder contained in the friction material.

The thickness of the friction layer made of the friction material according to the present invention is preferably at least 60 µm, and particularly preferably at least 75 µm. Preferably, the thickness of the friction layer is in a range of approximately 5 to 50% of the total thickness of the sintered friction lining.

By using the scatter-sintering process to produce a sintered friction lining further parameters affecting the friction behavior such as porosity, surface roughness, strength, and homogeneity of the friction lining can be set in a known manner. In particular, the sintering temperatures and the sintering periods can be selected depending on the shape and size of the component and the composition of the friction material.

It is particularly preferred that the friction lining thus produced is used in a friction body for clutches running in oil.

Examples 1 to 4

To produce sintered friction materials, powder blends having the composition stated in the following table are provided. The powder blends are scattered onto a planar steel sheet with a thickness of 1.2-2.2 mm and a diameter of 70 to 110 mm and kept at a temperature of 830 to 840° C. in the sintering furnace.

The friction linings made of the sintered friction materials that were thus obtained were compacted to a thickness of 450 to 500 µm, and the friction body was tested on a µ-comp clutch and synchronizer test stand of the company Hörbiger with steel as a friction surface counterpart. A sliding speed of 2 to 4 m/s with a compression of 2 to 4 MPa during oil flow at an oil temperature of 80° C. was selected. The development of the friction coefficient was determined via 10,000 successive shifts at various load levels.

The FIGURE shows the development of the friction coefficient of the friction materials tested. The addition of sintered cemented carbide results in a friction coefficient that improved by up to 20%. The best results are achieved with a proportion of approximately 1 weight percent of sintered cemented carbide. Proportions of 0.5 and 9 weight percent sintered cemented carbide show comparable friction coefficients. However, friction materials with a high carbide content tend to fail at higher load levels due to fretting.

TABLE

Composition of the friction materials (powder)

| | Example | | | |
|---|---|---|---|---|
| Constituent | 1 (Comparison) [Weight percent] | 2 [Weight percent] | 3 [Weight percent] | 4 [Weight percent] |
| Brass | 68.5 | 68 | 67.5 | 61 |
| Copper | 9 | 9 | 9 | 8.5 |
| Quartz | 4.5 | 4.5 | 4.5 | 4.5 |
| Graphite | 5.5 | 5.5 | 5.5 | 5 |
| Bronze | 7.5 | 7.5 | 7.5 | 7 |
| Tin | 5 | 5 | 5 | 5 |
| Sintered cemented carbide | 0 | 0.5 | 1 | 9 |

The invention claimed is:

1. A sintered friction material comprising a metallic matrix and granular constituents embedded in the matrix, the metallic matrix comprising a copper base alloy, wherein the granular constituents comprise at least a sintered cemented carbide in a proportion of 0.2 to 9 weight percent, based on the total weight of the friction material, and wherein the sintered friction material is obtained by sintering a powder blend having the following composition:
   60 to 91.8 weight percent of a copper base alloy;
   0 to 25 weight percent of further metals or metal alloys;
   5 to 15 weight percent of graphite;
   3 to 10 weight percent of granular constituents, except sintered cemented carbides, selected from metal oxides, carbides, nitrides, and borides;
   0.2 to 9 weight percent of a sintered cemented carbide powder; and
   0 to 15 weight percent of further additives selected from adhesion promotors, solders and fluxes;
   all powder constituents together being 100 weight percent.

2. The friction material according to claim 1, wherein the sintered cemented carbide has a grain size in a range of 1 to 200 µm.

3. The friction material according to claim 1, wherein the sintered cemented carbide has a primary grain size in a range of 1 to 15 µm.

4. The friction material according to claim 1, wherein the sintered cemented carbide comprises a metallic binder selected from the group consisting of iron, cobalt, nickel, chromium, molybdenum, aluminum, and combinations thereof.

5. The friction material according to claim 4, wherein the binder is an alloy of iron, chromium, and aluminum.

6. The friction material according to claim 1, wherein the sintered cemented carbide comprises 70 to 95 weight percent of tungsten carbide (WC) and 5 to 30 weight percent of a metallic binder, each based on the total weight of the sintered cemented carbide.

7. The friction material according to claim 6, wherein the sintered cemented carbide comprises 83.5 to 88% WC, 9 to 11% Fe, 2.5 to 4% Cr, and 0.5 to 1.5% Al, each based on the total weight of the sintered cemented carbide.

8. The sintered friction material according to claim 1 configured for use in a friction lining for a friction body running in oil.

9. A friction body including a friction lining, comprising at least one layer made of the sintered friction material according to claim 1.

10. The friction body according to claim 9, wherein the friction lining comprises at least one basic layer and one outermost friction layer arranged on the basic layer.

11. A method for the production of a friction lining comprising at least one layer made of a sintered friction material according to claim 1, in which a powder blend is provided, scattered onto a carrier or pressed into a friction foil, and subsequently sintered, wherein the powder blend has the following composition:

- 60 to 91.8 weight percent of a copper base alloy;
- 0 to 25 weight percent of further metals or metal alloys;
- 5 to 15 weight percent of graphite;
- 3 to 10 weight percent of granular constituents, except sintered cemented carbides, selected from metal oxides, carbides, nitrides, and borides;
- 0.2 to 9 weight percent of a sintered cemented carbide powder; and
- 0 to 15 weight percent of further additives selected from adhesion promotors, solders and fluxes;
- all powder constituents together being 100 weight percent.

* * * * *